US011126150B2

(12) United States Patent
Takami et al.

(10) Patent No.: US 11,126,150 B2
(45) Date of Patent: Sep. 21, 2021

(54) INFORMATION PROCESSING DEVICE, INFORMATION PROCESSING METHOD, AND STORAGE MEDIUM

(71) Applicant: Yokogawa Electric Corporation, Tokyo (JP)

(72) Inventors: Go Takami, Tokyo (JP); Yuichi Nozaka, Tokyo (JP); Hirotsugu Gotou, Tokyo (JP); Moe Tokuoka, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 881 days.

(21) Appl. No.: 15/808,048

(22) Filed: Nov. 9, 2017

(65) Prior Publication Data
US 2018/0136616 A1 May 17, 2018

(30) Foreign Application Priority Data
Nov. 11, 2016 (JP) .............................. JP2016-220524

(51) Int. Cl.
| G06N 20/10 | (2019.01) |
| G05B 13/02 | (2006.01) |
| G06N 20/00 | (2019.01) |
| G05B 23/02 | (2006.01) |
| G06Q 10/00 | (2012.01) |
| G06N 5/02  | (2006.01) |
| G01D 18/00 | (2006.01) |

(52) U.S. Cl.
CPC ......... *G05B 13/029* (2013.01); *G01D 18/008* (2013.01); *G05B 23/0224* (2013.01); *G05B 23/0283* (2013.01); *G06N 5/022* (2013.01); *G06N 20/00* (2019.01); *G06N 20/10* (2019.01); *G06Q 10/20* (2013.01)

(58) Field of Classification Search
CPC .... G06N 20/00; G06N 5/022; G05B 23/0224; G05B 23/0283; G05B 13/029; G06Q 10/20
USPC .......................................................... 706/12
See application file for complete search history.

(56) References Cited

U.S. PATENT DOCUMENTS

| 9,411,326 B2 * | 8/2016 | Tiwari ................... G05B 13/04 |
| 9,477,214 B2 * | 10/2016 | Tiwari ................... F01K 23/067 |

(Continued)

FOREIGN PATENT DOCUMENTS

| CN | 104596780 A | 5/2015 |
| CN | 106033425 A | 10/2016 |

(Continued)

OTHER PUBLICATIONS

Go Takemi et al., "Machine Learning Applied to Sensor Data Analysis", Yokogawa Technical Report, 2016, pp. 27-30, vol. 59, No. 1.

*Primary Examiner* — Lut Wong
(74) *Attorney, Agent, or Firm* — Sughrue Mion, PLLC

(57) ABSTRACT

An information processing device according to one aspect of the present invention includes a first acquirer configured to acquire measured data of a sensor, a second acquirer configured to acquire maintenance information related to maintenance performed on the sensor, a learner configured to learn teacher data in which the acquired maintenance information as label information is associated with the acquired measured data to generate a determination model, and a storage storing the generated determination model.

18 Claims, 9 Drawing Sheets

(56) References Cited

U.S. PATENT DOCUMENTS

| | | | |
|---|---|---|---|
| 10,466,283 B2* | 11/2019 | Homma | G01R 19/2509 |
| 2014/0025211 A1* | 1/2014 | Cheim | H02J 13/00034 |
| | | | 700/286 |
| 2014/0257526 A1* | 9/2014 | Tiwari | F01K 13/02 |
| | | | 700/29 |
| 2015/0220847 A1* | 8/2015 | Shibuya | G06N 20/00 |
| | | | 706/12 |
| 2015/0293523 A1* | 10/2015 | Yamamoto | G05B 19/4065 |
| | | | 700/175 |
| 2016/0140263 A1* | 5/2016 | Rojas | G05B 23/02 |
| | | | 703/18 |
| 2016/0188322 A1* | 6/2016 | De Groot | G05B 19/0426 |
| | | | 717/169 |
| 2016/0232723 A1* | 8/2016 | Karlsson | G01N 33/0037 |

FOREIGN PATENT DOCUMENTS

| | | | |
|---|---|---|---|
| EP | 2363773 | A2 | 9/2011 |
| EP | 3023851 | A1 | 5/2016 |
| JP | 9-97285 | A | 4/1997 |
| JP | 5081999 | B1 | 11/2012 |
| JP | 2014-174993 | A | 9/2014 |
| JP | 2015-18389 | A | 1/2015 |
| JP | 2015-148867 | A | 8/2015 |
| JP | 2015-530652 | A | 10/2015 |
| JP | 2015203646 | A | 11/2015 |
| WO | 2012073289 | A1 | 6/2012 |
| WO | 2014/031264 | A2 | 2/2014 |

* cited by examiner

FIG. 7

INSPECTION LIST (WORK HISTORY)

No: 145382

EXECUTION DATE AND TIME. 2016/8/2 10:25:00

PERSON IN CHARGE: ○○ ○○

EXECUTION PLACE: × × × ×

INSPECTION TARGET: △△ △△

INSPECTION ITEM

- ☐ SENSOR DETECTOR IS DIRTY
- ☐ CABLE IS BROKEN
- ☐ LIQUID LEAKAGE HAS OCCURRED
- ☐ THERE IS ABNORMAL ODOR
- ☐ SOLUTION HAS CHANGED IN COLOR
- ...
- ...
- ...

REMARKS:

CONFIRMER: ☐☐ ☐☐

FIG. 8

| MEASUREMENT DATE AND TIME | Sensor1 Param_1 | Sensor1 Param_2 | Sensor1 Param_3 | DETAILS OF MAINTENANCE | TEACHER DATA | LABEL (DETERMINED VALUE) | REMARKS |
|---|---|---|---|---|---|---|---|
| 2016/10/10 08:00:00 | 1.23 | 2.34 | 0.08 | — | ✓ | NO PROBLEM (0) | — |
| 2016/10/10 09:00:00 | 1.08 | 2.78 | 0.12 | — | ✓ | NO PROBLEM (0) | — |
| 2016/10/10 10:00:00 | 1.56 | 2.11 | 0.01 | — | ✓ | NO PROBLEM (0) | — |
| 2016/10/10 11:03:00 | 1.68 | 2.08 | 0.01 | ZERO-POINT ADJUSTMENT | — | — | REGULAR ADJUSTMENT |
| ... | ... | ... | ... | ... | ... | ... | ... |
| 2016/10/11 13:25:00 | 3.78 | 1.22 | 0.63 | ZERO-POINT ADJUSTMENT | ✓ | ZERO-POINT ADJUSTMENT IS REQUIRED(1) | PARAMETER ABNORMALITY |
| ... | ... | ... | ... | ... | ... | ... | ... |
| 2016/10/13 15:45:20 | 2.22 | 3.14 | 1.35 | SENSOR CLEANING | ✓ | SENSOR CLEANING IS REQUIRED(2) | SENSOR DETECTOR IS DIRTY |
| ... | ... | ... | ... | ... | ... | ... | ... |
| 2016/10/25 11:03:45 | 0 | 2.32 | 0.22 | SENSOR CLEANING | ✓ | SENSOR REPLACEMENT IS REQUIRED(3) | PARAMETER ABNORMALITY |

INFORMATION PROCESSING DEVICE, INFORMATION PROCESSING METHOD, AND STORAGE MEDIUM

The present application claims priority based on Japanese patent application 2016-220524, filed on Nov. 11, 2016 and includes herein by reference the content thereof.

BACKGROUND OF THE INVENTION

Field of the Invention

The present invention relates to an information processing device, an information processing method, and a storage medium.

Description of Related Art

In plants or factories (hereinafter referred to collectively as "plants") such as industrial plants such as chemical plants, plants for managing and controlling well sources such as gas fields and oil fields and surroundings, plants for controlling and managing hydroelectric power generation, thermal power generation, nuclear power generation and the like, plants for managing and controlling environmental power generation such as solar power generation and wind power generation, and plants for managing and controlling drinking water and sewage, dams and the like, a distributed control system (DCS) in which a field apparatus called field equipment, such as a measuring instrument or an operating instrument, is connected to a control device for controlling the same through a communication means has been constructed to realize enhanced automated operations.

In the aforementioned plant system constructed in order to realize enhanced automated operations and the like, the state of the plant such as the yield of the plant, an operating state or an alarm generation situation is measured using sensors (including measuring instruments or the like) installed in the plant. Measured data from measurement by the sensor is acquired by a control device such as a DCS and used to control the plant. Sensors for obtaining the measured data may break down depending on the usage time and a usage environment, or measured values thereof may be shifted. When the sensors break down, the operation of the plant may be affected. Accordingly, an operator who maintains the plant performs maintaining operations (maintenance) of regularly adjusting or replacing the sensors before the sensors break down.

Meanwhile, there is a machine learning system which creates a determination model through machine learning of measured data of a sensor as teacher data and diagnoses breakdown or deterioration of the sensor using the determination model in plant control. For example, refer to Japanese Unexamined Patent Application, First Publication No. 2014-174993, Published Japanese Translation No. 2015-530652 of the PCT International Publication, and Go Takami et al., "Machine Learning Applied to Sensor Data Analysis", Yokogawa Technical Report, Yokogawa Electric Corporation, Vol. 59, No. 1 (2016), p. 27-30.

SUMMARY OF THE INVENTION

Since a deterioration progress state and the life of a sensor greatly vary on the situation in which the sensor is used and the environment in which the sensor is installed, maintenance work is also performed on sensors which do not require adjustment and replacement when sensors are regularly maintained. Accordingly, there are some cases in which the maintenance costs are increased. There are some cases in which an operator individually determines a usage status of a sensor or decides a sensor maintenance time.

When measured data of a sensor is learnt as teacher data for deciding whether there has been breakdown or deterioration of a sensor through machine learning, the teacher data is affected by regular maintenance work. Accordingly, there are some cases in which it is difficult to acquire teacher data indicating a sign of breakdown or the like simply by acquiring measured data in a time series, and then a determination model for deciding breakdown or the like cannot be generated.

One aspect of the present invention provides an information processing device, an information processing method, and a storage medium which can correctly determine a sensor maintenance time to reduce maintenance costs.

An information processing device according to a first aspect of the present invention may include a first acquirer configured to acquire measured data of a sensor, a second acquirer configured to acquire maintenance information related to maintenance performed on the sensor, a learner configured to learn teacher data in which the acquired maintenance information as label information is associated with the acquired measured data to generate a determination model, and a storage storing the generated determination model.

The above-stated information processing device may further include a generator configured to generate a maintenance plan for the sensor on the basis of the acquired measured data and the stored determination model.

The above-stated information processing device may further include a notifier configured to perform notification of the generated maintenance plan.

In the above-stated information processing device, the first acquirer may be configured to acquire a plurality of types of measured data. The learner may be configured to associate the maintenance information as label information with the acquired plurality of types of measured data and learn the measured data associated with the label information.

In the above-stated information processing device, the learner may be configured to associate the label information with the measured data and learn the measured data associated with the label information on the basis of an implementation status of the maintenance.

The above-stated information processing device may further include a converter configured to convert image information of a maintenance record recorded by an operator into character information. The second acquirer may be configured to acquire the maintenance information by acquiring the character information.

In the above-stated information processing device, the learner may be configured to select whether to set the acquired measured data as teacher data and learn the selected teacher data.

In the above-stated information processing device, the learner may be configured to set as teacher data measured data including normal measured values and acquired regularly.

In the above-stated information processing device, the learner may be configured not to set as teacher data measured data acquired in regular adjustment for the sensor.

In the above-stated information processing device, the learner may be configured to set as teacher data first measured data and second measured data, the first measured data being acquired in maintenance work for the sensor, the second measured data being acquired during a predetermined period before the measurement date and time of the first measured data.

An information processing method according to a second aspect of the present invention may include acquiring measured data of a sensor, acquiring maintenance information related to maintenance performed on the sensor, learning teacher data in which the acquired maintenance information as label information is associated with the acquired measured data to generate a determination model, and storing the generated determination model.

The above-stated information processing method may further include generating a maintenance plan for the sensor on the basis of the acquired measured data and the stored determination model.

The above-stated information processing method may further include performing notification of the generated maintenance plan.

In the above-stated information processing method, acquiring the measured data may include acquiring a plurality of types of measured data. Learning the teacher data may include associating the maintenance information as label information with the acquired plurality of types of measured data and learning the measured data associated with the label information.

In the above-stated information processing method, learning the teacher data may include associating the label information with the measured data and learning the measured data associated with the label information on the basis of an implementation status of the maintenance.

The above-stated information processing method may further include converting image information of a maintenance record recorded by an operator into character information. Acquiring maintenance information may include acquiring the maintenance information by acquiring the character information.

In the above-stated information processing method, learning the teacher data may include selecting whether to set the acquired measured data as teacher data and learning the selected teacher data.

In the above-stated information processing method, learning the teacher data may include setting as teacher data measured data including normal measured values and acquired regularly.

In the above-stated information processing method, learning the teacher data may include setting as teacher data first measured data and second measured data, the first measured data being acquired in maintenance work for the sensor, the second measured data being acquired during a predetermined period before the measurement date and time of the first measured data.

A non-transitory computer-readable storage medium storing a program according to a third aspect of the present invention, which when executed by a computer, may cause the computer to acquire measured data of a sensor, acquire maintenance information related to maintenance performed on the sensor, learn teacher data in which the acquired maintenance information as label information is associated with the acquired measured data to generate a determination model, and store the generated determination model.

According to one aspect of the present invention, it is possible to provide an information processing device, an information processing method, and a storage medium which can correctly determine a sensor maintenance time to reduce maintenance costs.

BRIEF DESCRIPTION OF THE DRAWINGS

FIG. 7 is a diagram showing an example of an inspection list through which the information processing device of embodiments acquires maintenance information.

FIG. 8 is a diagram showing an example of teacher data generated by the information processing device of embodiments.

DETAILED DESCRIPTION OF THE INVENTION

Hereinafter, an information processing device, an information processing method, and a storage medium in embodiments of the present invention will be described in detail with reference to the drawings.

Figure 1:
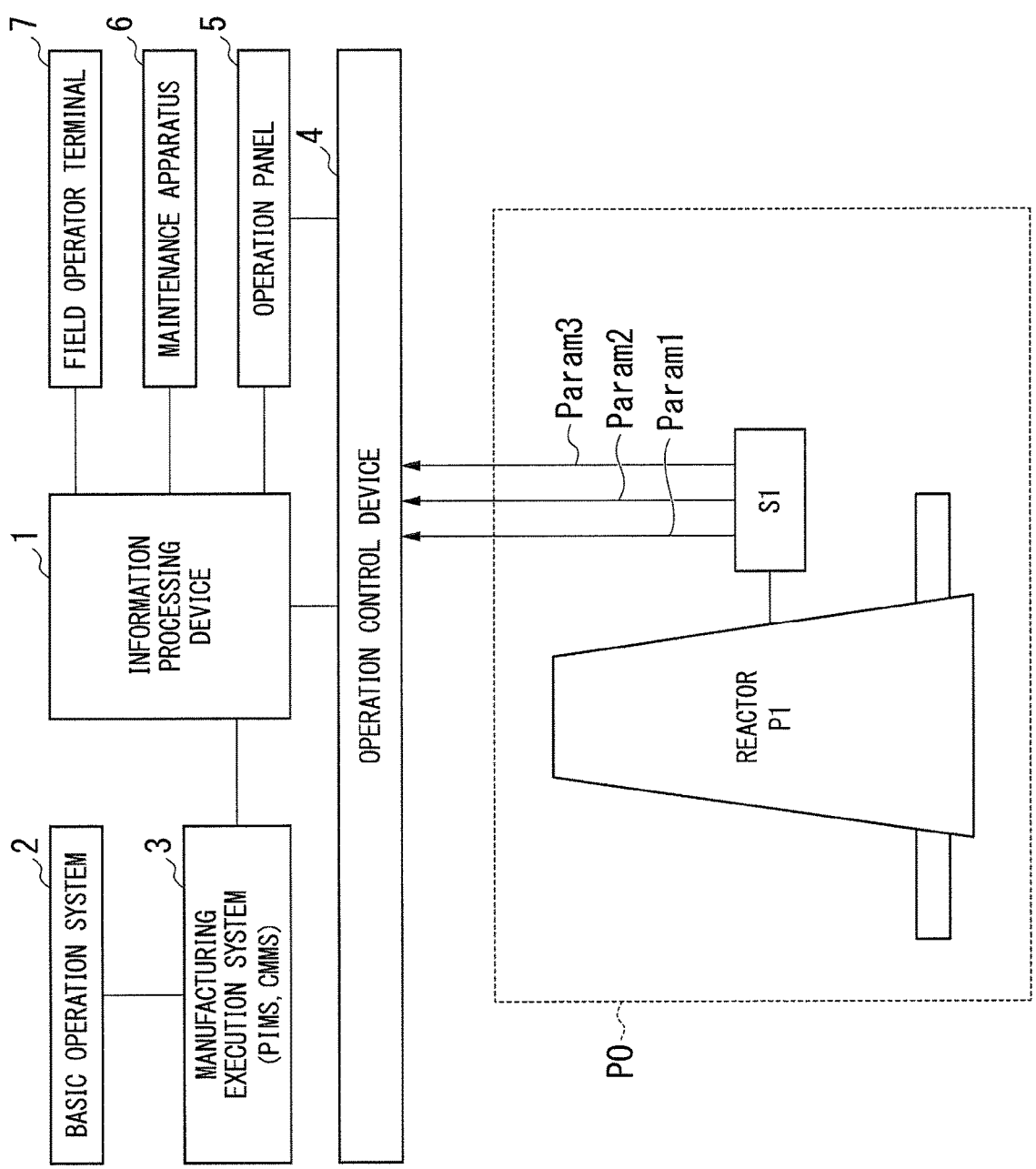
FIG. 1 is a diagram showing an example of a configuration of a plant using an information processing device of embodiments.

The summary of a plant using an information processing device will be described with reference to FIG. 1. FIG. 1 is a diagram showing an example of a configuration of a plant using an information processing device of embodiments. In FIG. 1, a plant 100 includes an information processing device 1, a basic operation system 2, a manufacturing execution system 3, an operation control device 4, an operation panel 5, a maintenance apparatus 6, a field operator terminal 7, and a plant apparatus P0. The plant apparatus P0 includes a reactor P1 and a sensor S1. The plant apparatus P0 generates a predetermined product. FIG. 1 shows a case in which the sensor S1 as an example of multiple sensors installed in the plant is a target of maintenance work.

For example, the reactor P1 may be a device which generates a product through chemical reaction of materials put thereinto. The sensor S1 obtains measured data indicating an operational state of the reactor P1. The measured data indicating an operational state of the reactor P1 is physical quantity data, for example, a pressure, a temperature, a flowrate of a product and the like inside of the reactor P1. The sensor S1 inputs measured values of parameter 1, parameter 2 and parameter 3 of three types to the operation control device 4.

The sensor S1 deteriorates or breaks down over time depending on situations in which the sensor S1 is used. A maintenance operator who maintains the plant checks a state such as a measured value of the sensor S1 regularly or irregularly and performs maintenance work on the sensor S1 as necessary. In the present embodiment, three types of maintenance works which are sensor cleaning, sensor zero-point adjustment and sensor replacement are described as maintenance work performed on the sensor S1.

For example, when dirt adheres to a detector (measurement element) of a sensor, measured values of parameter 1 to parameter 3 output from the sensor S1 may become abnormal. When the measured values become normal as a result of maintenance work of cleaning the sensor S1, the maintenance operator can confirm that abnormality of the measured values was caused by dirt adhering to the detector.

There are cases in which the zero point (including a span) may deviate due to changes in the sensor S1 over time to result in abnormal measured values. When the maintenance operator performs maintenance work for zero-point adjustment and thus the measured values become normal, the maintenance operator can confirm that the cause of abnormality of the measured values was mis-adjustment of the zero-point.

There are cases in which the sensor S1 may reach an unrecoverable breakdown state due to deterioration or the like and thus measured values become abnormal. When maintenance work for sensor replacement is performed and thus the measured values become normal, the maintenance operator can confirm that the cause of abnormality of the measured values was sensor breakdown.

Such causes of abnormality of the measured values of the sensor S1 are determined according to the experience of the operator and confirmed by the maintenance work. Determination of the causes of abnormality of measured values depends on an experience level of the maintenance operator. Accordingly, it may be difficult to identify the cause of abnormality if only the current measured value of the sensor S1 has been obtained, for example. In the case of a sensor outputting multiple measured values such as parameter 1 to parameter 3, like the sensor S1, the measured value of each parameter may be affected differently depending on the causes of abnormality. In the sensor S1 outputting multiple measured values (measured data), a high experience level of the maintenance operator is required because the cause of abnormality is determined from the relationship between measured values. The maintenance operator performs maintenance work, confirms the cause of abnormality when measured values become normal and records the result. For example, when the maintenance work is performed using the maintenance apparatus 6, a history (results) of the maintenance work is recorded in the maintenance apparatus 6. That is, the details of the maintenance work and measured value changes between before and after execution of the maintenance work are recorded in the maintenance apparatus 6. The maintenance operator writes and records the details of performed maintenance in an inspection list or the like. That is, know-how in determination of breakdown of the sensor S1 may be recorded in the maintenance apparatus 6 and the inspection list.

Meanwhile, there are cases in which zero-point adjustment or replacement of the sensor S1 may be performed before the sensor S1 changes over time. When abnormality of the sensor S1 greatly affects the operation of the plant, preventive maintenance of performing adjustment or replacement of a sensor which has not changed over time or deteriorated yet is performed regularly at predetermined intervals. Since the progress of deterioration of a sensor depends on the situation in which the sensor is used, and the like, maintenance work may be performed also on a normal sensor which does not require maintenance work when maintenance work is uniformly regularly performed.

In the present embodiment, a case in which preventive maintenance performed before measured values become abnormal and subsequent maintenance performed when abnormality occurs coexist is exemplified. Three items of maintenance work of (1) zero-point adjustment, (2) sensor cleaning and (3) sensor replacement will be exemplified and described below as maintenance work performed on the sensor S1.

The information processing device 1 acquires measured data of parameter 1 to parameter 3 from measurement by the sensor S1 in a time series using the operation control device 4. The information processing device 1 learns the acquired measured data as teacher data to generate a determination model and decides a maintenance time of the sensor S1 on the basis of the acquired measured data using the generated determination model. The information processing device 1 may output the determination result to the manufacturing execution system 3, the maintenance apparatus 6 and the field operator terminal 7. The operation of the information processing device 1 will be described in detail below.

A maintenance operator may be a field operator who operates the plant. Although a case in which the plant apparatus P0 includes the reactor P1 and the sensor S1 is shown in FIG. 1, the configuration of the plant apparatus P0 is not limited thereto. For example, the plant apparatus P0 may include apparatuses such as a tank, a valve, a pump and other sensors. The sensor S1, a valve or a pump included in the plant apparatus P0 will be referred to as "field apparatuses" hereinafter. Lines connecting apparatuses shown in FIG. 1 indicate wired or wireless communication lines. Wired communication or wireless communication may be performed via a communication apparatus and a network which are not shown.

For example, the basic operation system 2 is an enterprise resource planning (ERP) system for the process manufacturing industry for management of enterprise resources, such as financial management, production management and sales management. The basic operation system 2 may use information on an operational state of the plant as enterprise resource management information. The basic operation system 2 may include a maintenance management system which manages operation information on maintenance and repair of the plant, and the like. For example, the basic operation system 2 is a general-purpose computer such as a server device and a desk-top PC.

For example, the manufacturing execution system 3 is a MES (Manufacturing Execution System) located between the basic operation system 2 and the operation control device 4 and monitors or manages the operating state of the plant apparatus P0, acquired by the operation control device 4, a working situation of an operator, and the like. The manufacturing execution system 3 is a general-use computer such as a server device and a desk-top PC, for example. The manufacturing execution system has a function such as that of a plant information management system (PIMS) or a computerized maintenance management system (CMMS) or the like.

The PIMS collects state information of the plant, such as measured data of the sensor S1, from the operation control device 4 and records the collected state information. The PIMS collects the measured data of the sensor S1 in a time series and records the measured data as history data. In the present embodiment, the PIMS provides history data of measured data to the information processing device 1. The information processing device 1 provides a predicted maintenance time of the sensor S1 decided in machine learning which will be described below to the PIMS.

The CMMS records the maintenance history of the plant apparatus P0 and manages a maintenance plan. For example, the CMMS acquires an operation history of a maintenance operation for a field apparatus, which has been performed and recorded by the maintenance apparatus 6, from multiple maintenance apparatuses 6 and records the operation history as maintenance information. The CMMS may process maintenance work performed by a field operator such that the maintenance work can be manually input and record the same as maintenance information. The CMMS provides a history of recorded maintenance information of the sensor S1 to the information processing device 1. Details of the maintenance information will be described below.

The operation control device 4 controls pumps and valves which are not shown on the basis of the measured data acquired from the sensor S1 to control generation of products in the reactor P1. The operation control device 4 provides the measured data acquired from the sensor S1 to the information processing device 1. The operation control device 4 may acquire a determination result from measured values of the sensor S1 decided in the information processing device 1 and control the plant apparatus P0 on the basis of the determination result. For example, the operation control device 4 may be a factory automation computer, a programmable logic controller or the like.

The operation panel 5 is a device through which a field operator of the plant monitors the operating state of a field apparatus and operates the field apparatus. For example, the operation panel 5 includes display apparatuses such as a lamp and a display or operation apparatuses such as a push button switch and a keyboard. In the present embodiment, the operation panel 5 may acquire a determination result from measured values of the sensor S1 decided in the information processing device 1 and notify the determination result to the field operator.

The maintenance apparatus 6 is used by the field operator to perform maintenance of a field apparatus. For example, maintenance of a field apparatus includes processing of reading and checking apparatus information set in the field apparatus, processing of setting new apparatus information (parameters) in the field apparatus, processing of adjusting or changing apparatus information set in the field apparatus, processing for setting apparatus information to the field apparatus to cause the field apparatus to execute a predetermined operation, etc. The maintenance apparatus 6 records maintenance performed for the field apparatus in the maintenance apparatus 6 as an apparatus operation history. The maintenance apparatus 6 provides information on the recorded apparatus operation history to the information processing device 1. The maintenance apparatus 6 may acquire a maintenance plan on the basis of a determination result from measured values of the sensor S1 decided in the information processing device 1 and instruct the field operator to perform maintenance work for the sensor S1 on the basis of the acquired maintenance plan. The maintenance apparatus 6 is a notebook or tablet computer, a personal digital assistant (PDA), a smartphone or the like.

The field operator terminal 7 is a terminal device carried by the field operator. The field operator terminal 7 may acquire a determination result from measured values of the sensor S1 decided in the information processing device 1 and instruct the field operator to perform maintenance work on the sensor S1 on the basis of the determination result. The field operator terminal 7 is a notebook or tablet computer, a PDA, a smartphone or the like.

The information processing device 1 communicates with the manufacturing execution system 3, the operation control device 4, the operation panel 5, the maintenance apparatus 6 and the field operator terminal 7, acquires information necessary for machine learning related to maintenance of the sensor S1 as input information, and provides information based on a determination result of machine learning to the operation control device 4 as output information.

Figure 2:
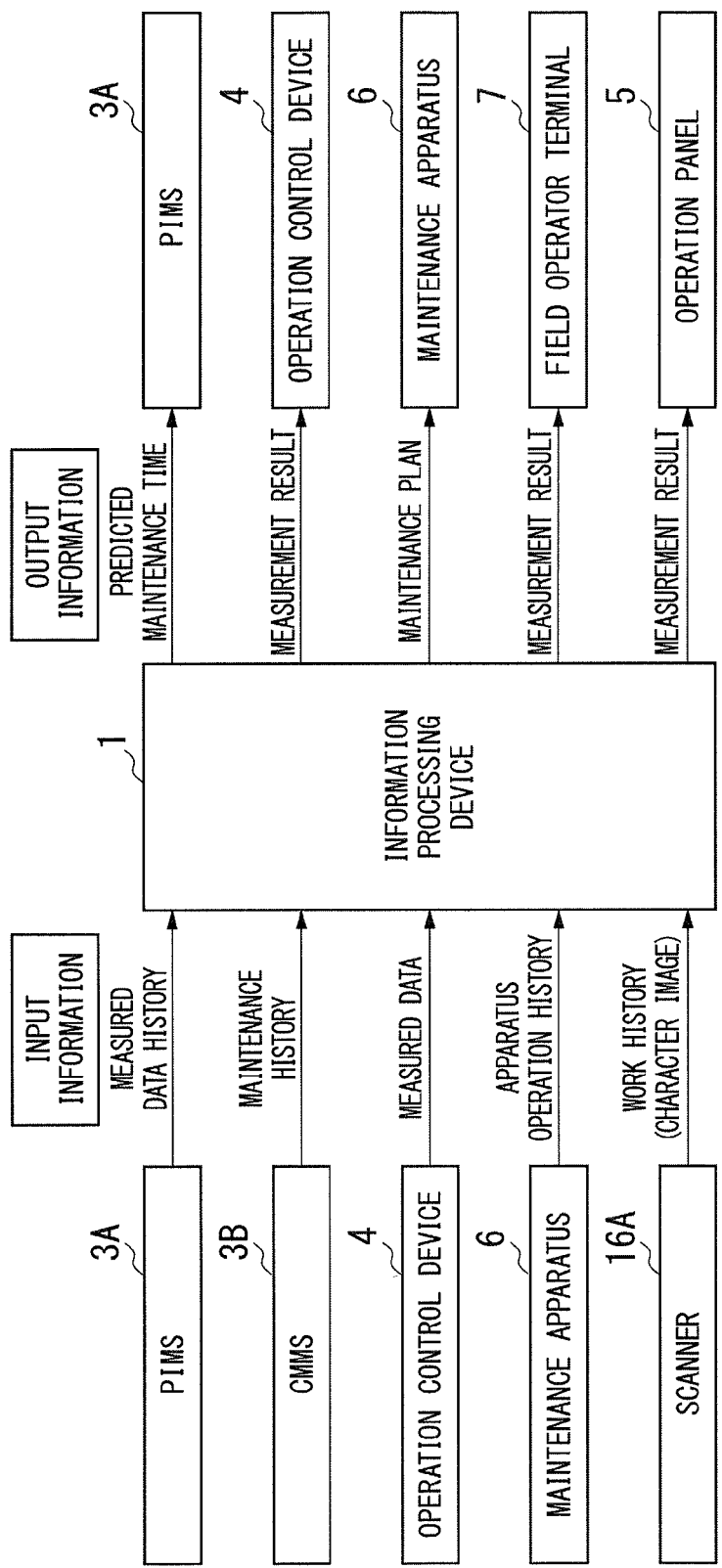
FIG. 2 is a diagram showing an example of input information and output information of the information processing device of embodiments.

Next, input information acquired by the information processing device 1 and output information provided by the information processing device 1 will be described with reference to FIG. 2. FIG. 2 is a diagram showing an example of input information and output information of the information processing device of embodiments.

<Input information>

In FIG. 2, the information processing device 1 acquires a history of measured data of the sensor S1 (measured data history) from a PIMS 3A as input information. The measured data history is history data in which measured values of parameter 1 to parameter 3 of the sensor S1 and measurement dates and times when the measured values were obtained have been stored in the order of measurement dates and times. A part of the measured data in which measurement dates and times included in the measured data history have been recorded is associated with maintenance information which will be described below and becomes teacher data of machine learning. That is, the measured data history includes measured data which becomes teacher data and measured data which does not become teacher data.

The information processing device 1 acquires a history of maintenance information (maintenance history) in which maintenance work of the sensor S1 has been recorded from a CMMS 3B as input information. The maintenance history includes details of maintenance work performed on the sensor S1 and information on dates and times when the maintenance work was performed. As described in FIG. 1, three items of maintenance work of (1) zero-point adjustment, (2) sensor cleaning and (3) sensor replacement are performed on the sensor S1. The maintenance history includes maintenance information of any one of this maintenance work.

The information processing device 1 acquires measured data of the sensor S1 from the operation control device 4 as input information. For example, the measured data of the sensor S1 acquired from the operation control device 4 is data obtained in approximately real time. The measured data acquired from the operation control device 4 is used as a target for determination in an execution phase of machine learning. The measured data acquired from the operation control device 4 may be used as teacher data.

The information processing device 1 acquires maintenance information of an apparatus operation history from the maintenance apparatus 6 as input information. While the apparatus operation history of the maintenance apparatus 6 is acquired through the CMMS 3B, the information processing device 1 may directly acquire the apparatus operation history from the maintenance apparatus 6.

The information processing device 1 acquires a work history written on an inspection list and recorded by the maintenance operator as maintenance information. For example, the information processing device 1 may optically read an image of the work history written on the inspection list using a scanner 16A which is an example of an input device 16 which will be described below in FIG. 3, perform an optical character recognition (OCR) process on the read image to convert character information into electronic data and thereby acquire maintenance information. The inspection list has a predetermined form and the maintenance operator writes performed maintenance work in the predetermined form. Either of the maintenance information acquired from the inspection list and the maintenance information acquired from the maintenance apparatus 6 may be used.

<Output Information>

The information processing device 1 provides information on a predicted maintenance time of the sensor S1 to the PIMS 3A on the basis of a determination of machine learning. For example, the predicted maintenance time may be a time when measured values of the sensor S1 become abnormal, a time when maintenance work must be performed on the sensor S1 next time, or the like. The field operator can make a maintenance plan for the sensor S1 on the basis of the information on the predicted maintenance time provided.

The information processing device 1 provides a determination result of machine learning to the operation control device 4. The operation control device 4 controls the operation of the plant on the basis of the provided determination result. For example, the operation control device 4 may control the plant such that the operation stops or is interrupted when the determination result is sensor replacement.

The information processing device 1 provides information on a maintenance plan to the maintenance apparatus 6 on the basis of the determination result of machine learning. For example, the information on a maintenance plan may be information representing, as a ToDo list, maintenance work to be performed which includes maintenance work of the sensor S1. The maintenance operator carries the maintenance apparatus 6 and performs maintenance work while checking the ToDo list displayed on the maintenance apparatus 6.

The information processing device 1 provides the determination result of machine learning to the field operator terminal 7. The maintenance operator carries the field operator terminal 7 and performs maintenance work on the basis of the determination result, for example, sensor replacement, displayed on the field operator terminal 7.

The information processing device 1 provides the determination result of machine learning to the operation panel 5 as it does for the field operator terminal 7. The maintenance operator performs maintenance work on the basis of the determination result, for example, sensor replacement, displayed on the operation panel 5.

The determination result output from the information processing device 1 and the details of any one of the aforementioned outputs are referred to as a "maintenance plan" hereinafter. The maintenance plan may include information related to maintenance notified to the maintenance operator and the details thereof are arbitrary. The maintenance plan may include only the determination result, for example.

Figure 3:
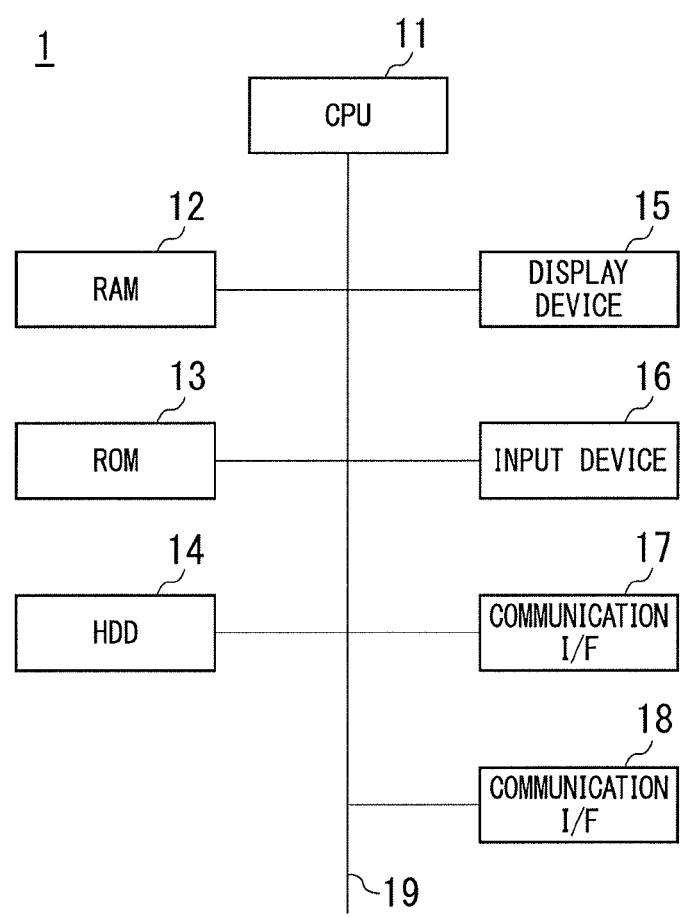
FIG. 3 is a block diagram showing an example of a hardware configuration of the information processing device of embodiments.

Next, a hardware configuration of the information processing device 1 will be described with reference to FIG. 3. FIG. 3 is a block diagram showing an example of the hardware configuration of the information processing device 1 of embodiments.

In FIG. 3, the information processing device 1 includes a central processing unit (CPU) 11, a random access memory (RAM) 12, a read only memory (ROM) 13, a hard disk drive (HDD) 14, a display device 15, the input device 16, a communication interface (I/F) 17, a communication I/F 18 and a bus 19 connecting such components.

For example, the information processing device 1 is a general-purpose computer such as a server device and a desk-top PC, a device such as an FA computer and a PLC, a notebook or table computer, a PDA, a smartphone, or the like. The hardware of the information processing device 1 may be configured as a single device or may be a system configured as a combination of multiple devices. The information processing device 1 may share hardware with other devices.

The CPU 11 controls the information processing device 1 by executing a program stored in the RAM 12, the ROM 13 or the HDD 14. The CPU 11 executes an information processing program for realizing the operation of the information processing device 1, which will be described below. For example, the information processing program is acquired from a storage medium in which information processing programs have been recorded or a server which provides information processing programs via a network, installed in the HDD 14, and is stored in the RAM 12 such that the CPU 11 can read the information processing program.

For example, the display device 15 is a liquid crystal display having a display function. The display device 15 may be realized in various forms such as a head-mount type display, a glasses-type display and a wrist-watch type display. The input device 16 is a keyboard or a mouse having an input function, for example. The input device 16 may be a microphone to which audio information is input, a camera or a scanner to which video information is input, or the like. In the present embodiment, the scanner 16A is used as the input device 16. The display device 15 and the input device 16 may be realized as a device having a display function and an input function, such as a touch panel.

The communication I/F 17 controls communication with other devices such as the manufacturing execution system 3, the operation control device 4, the maintenance apparatus 6, and the field operator terminal 7 described in FIG. 1 through wired communication or wireless communication. The communication I/F 17 performs communication control such as data transmission/reception, and voice speech or mail transmission/reception with respect to other connected devices. For example, the communication I/F 17 performs communication control in conformance with a general-purpose communication standard such as wireless LAN communication, wired LAN communication, infrared communication or short-range RF communication.

The communication I/F 18 controls communication with other devices such as the operation control device 4, the operation panel 5, the maintenance apparatus 6, and a field apparatus which is not shown through wired communication or wireless communication. For example, the communication I/F 18 may perform communication control in conformance with a communication standard dedicated to industrial measuring instruments, such as ISA 100 which is a wireless communication standard of the International Society of Automation (ISA), Highway Addressable Remote Transducer (HART) (registered trademark), BRAIN (registered trademark), FOUNDATION Fieldbus or PROFIBUS.

Figure 4:
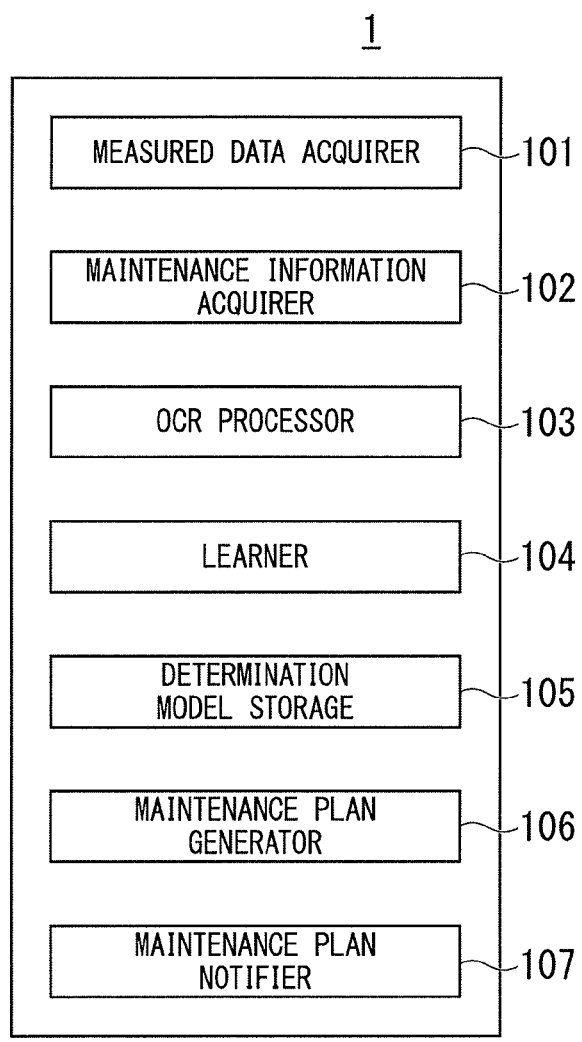
FIG. 4 is a block diagram showing an example of a software configuration of the information processing device of embodiments.

Next, a software configuration of the information processing device 1 will be described with reference to FIG. 4. FIG. 4 is a block diagram showing an example of the software configuration of the information processing device 1 of embodiment.

In FIG. 4, the information processing device 1 has functions of a measured data acquirer 101 (first acquirer), a maintenance information acquirer 102 (second acquirer), an OCR processor 103 (converter), a learner 104, a determination model storage 105 (storage), a maintenance plan generator 106 (generator) and a maintenance plan notifier 107 (notifier). The aforementioned functions of the information processing device 1 are function modules realized by an information processing program which controls the information processing device 1. The information processing program may be provided by a server which provides programs or provided from a storage medium.

The measured data acquirer 101 acquires measured data of the sensor S1 from the operation control device 4. The measured data acquirer 101 acquires a measured data history of the sensor S1 from the PIMS 3A. The measured data acquired from the operation control device 4 is obtained from the sensor S1 in approximately real time. Acquisition in approximately real time includes acquisition immediately after measurement through the sensor 1 or acquisition after a predetermined delay time. Acquisition in approximately real time includes a case in which measured data is acquired at short intervals such as several seconds. On the other hand, the measured data history acquired from the PIMS 3A is a history of a plurality of pieces of measured data recorded for a predetermined period, for example, one hour, one day, one week or the like. The measured data history is used in a learning phase which will be described below. On the other hand, the measured data is used in an execution phase (or learning phase).

The measured data acquirer 101 may have a function of a preprocessor. The preprocessor selects teacher data from the acquired measured data and adjusts the teacher data to increase the accuracy of a generated determination model. For example, the preprocessor performs an abnormal value elimination process and a normalization process. The abnormal value elimination process is a process for eliminating abnormal values which are not suitable for learning from the acquired measured data. Whether measured data is an abnormal value can be determined using the standard deviation when the measured data is used as a sample and a predetermined verification method, for example. For example, the preprocessor may eliminate measured data as an abnormal value when it is determined that abnormal measured data has been acquired such as when the plant is set up, shut down, idle or the like. The normalization process is a process of analyzing the acquired measured data and adjusting (normalizing) the amplitude of the measured data. For example, normalization may be performed in such a manner that the amplitude of the measured data is aligned with a maximum value of the acquired amplitude.

The maintenance information acquirer 102 acquires maintenance information. The maintenance information is information in which actual results of maintenance work have been recorded and includes information on dates when maintenance work was performed. The maintenance information acquirer 102 acquires, from the CMMS 3B, maintenance information included in the CMMS 3B. The maintenance information acquirer 102 acquires maintenance information of an apparatus operation history from the maintenance apparatus 6. The OCR processor 103 converts image information of an inspection list work history optically read through the scanner 16A into character information. The maintenance information acquirer 102 acquires the maintenance information of the work history converted into the character information. The maintenance information acquirer 102 may acquire any one piece of such maintenance information or acquire a plurality of pieces of maintenance information from such maintenance information.

The learner 104 generates a determination model through machine learning of teacher data with which the maintenance information acquired by the maintenance information acquirer 102 is associated, as label information, to the measured data acquired by the measured data acquirer 101.

The learner 104 may use a nonlinear classification method, for example, support vector machine (SVM) and the like, as a machine learning method. SVM generates a determination line (determination model) for clustering measured data using the measured data as input data and decides a class of the measured data using the generated determination model. The determination line is a boundary line for clustering measured data. The determination line is generated by learning measured data as teacher data.

The learner 104 uses a multi-class SVM (MMSVM) method having n classes (multiple classes) for classification. In MMSVM, "nC2" SVMs are provided for n classes. Classes are classified by labels associated therewith. A label is a flag for clustering input data. In machine learning using teacher data, a label is associated with data learnt as teacher data from input data to learn labeled teacher data. The learner 104 learns teacher data for generating a determination model for deciding a label to which input data is clustered. In the present embodiment, the learner 104 learns teacher data in which any one of four labels of (1) zero-point adjustment is required, (2) sensor cleaning is required, (3) sensor replacement is required, and (0) no problem is associated with measured data.

The machine learning method used in the learner 104 is not limited to an SVM and may use a neural network method, for example, deep learning.

The determination model storage 105 readably stores the determination model generated in the learner 104 in, for example, the ROM 31 or the HDD 14 of FIG. 3. The determination model storage 105 may store a plurality of determination models for the sensor S1.

The maintenance plan generator 106 reads the determination model stored in the determination model storage 105 in an execution phase of machine learning and performs determination for the measured data acquired by the measured data acquirer 101 using the read determination model. The determination result represents whether the measured data is associated with any one of the aforementioned four labels (whether the measured data is clustered). The maintenance plan generator 106 generates a maintenance plan for the sensor S1 on the basis of the determination result.

For example, there may be determination results of four types of (0) no problem, (1) zero-point adjustment is required, (2) sensor cleaning is required, and (3) sensor replacement is required. In the case of the determination result indicating (0) no problem, the maintenance plan generator 106 does not generate a maintenance plan or generates a maintenance plan indicating "no maintenance is required." In the case of the determination result indicating (1) zero-point adjustment is required, the maintenance plan generator 106 generates a maintenance plan for zero-point adjustment. In the case of the determination result indicating (2) sensor cleaning is required, the maintenance plan generator 106 generates a maintenance plan for sensor cleaning. In the case of the determination result indicating (3) sensor replacement is required, the maintenance plan generator 106 generates a maintenance plan for sensor replacement.

The maintenance plan generated by the maintenance plan generator 106 includes, for example, a predicted maintenance time (predicted date and time) when maintenance is required. For example, the predicted maintenance time may be calculated from a change over time in a distance between measured data and the determination line of the determination model. The maintenance plan may include, for example, information having a ToDo list including maintenance work to be performed which includes maintenance work for the sensor S1. For example, the ToDo list may be generated by adding maintenance items of the sensor S1 based on the determination result to information of a ToDo list acquired from the CMMS 3B. The maintenance plan generated by the maintenance plan generator 106 may include information such as a deterioration level and urgency. For example, the deterioration level may be calculated from a distance to the determination line used for clustering in the determination model. The urgency may be decided according to a preset importance of a sensor from which measured data has been acquired in the plant. For example, the importance may be determined based on plant safety, the level of the influence on the quality of products generated in the plant, and the like.

The maintenance plan notifier 107 provides the maintenance plan generated in the maintenance plan generator 106 to the PIMS 3A, the operation control device 4, the operation panel 5, the maintenance apparatus 6, the field operator terminal 7, the display device 15 and the like to notify the maintenance plan to the maintenance operator.

For example, the maintenance plan notifier 107 may provide the determination result (label) and information on the predicted maintenance time of the sensor S1 to the PIMS 3A as a maintenance plan, for example. The maintenance operator may make a plan for maintaining the sensor S1 on the basis of the notification of the information of the predicted maintenance time provided to the PIMS 3A.

The maintenance plan notifier 107 may provide only the determination result to the operation control device 4, for example, as a maintenance plan. The operation control device 4 then controls operation of the plant on the basis of the provided determination result.

The maintenance plan notifier 107 may provide the determination result and the ToDo list including the maintenance work for the sensor S1 to the maintenance apparatus 6, for example, as a maintenance plan. The maintenance operator may perform maintenance work while checking the ToDo list provided to the maintenance apparatus 6.

The maintenance plan notifier 107 may provide only the determination result to the operation panel 5 or the field operator terminal 7, for example, as a maintenance plan. The maintenance operator may perform maintenance work for the sensor S1 on the basis of the determination result provided to the operation panel 5 or the field operator terminal 7.

The case in which the functions of the measured data acquirer 101, the maintenance information acquirer 102, the OCR processor 103, the learner 104, the determination model storage 105, the maintenance plan generator 106 and the maintenance plan notifier 107 of the information processing device 1 in FIG. 4 are realized by software has been described. However, one or more of the aforementioned functions may be realized by hardware. In the aforementioned functions, one function may be divided into a plurality of functions and implemented. Two or more functions may be integrated into one function and implemented.

Figure 5:
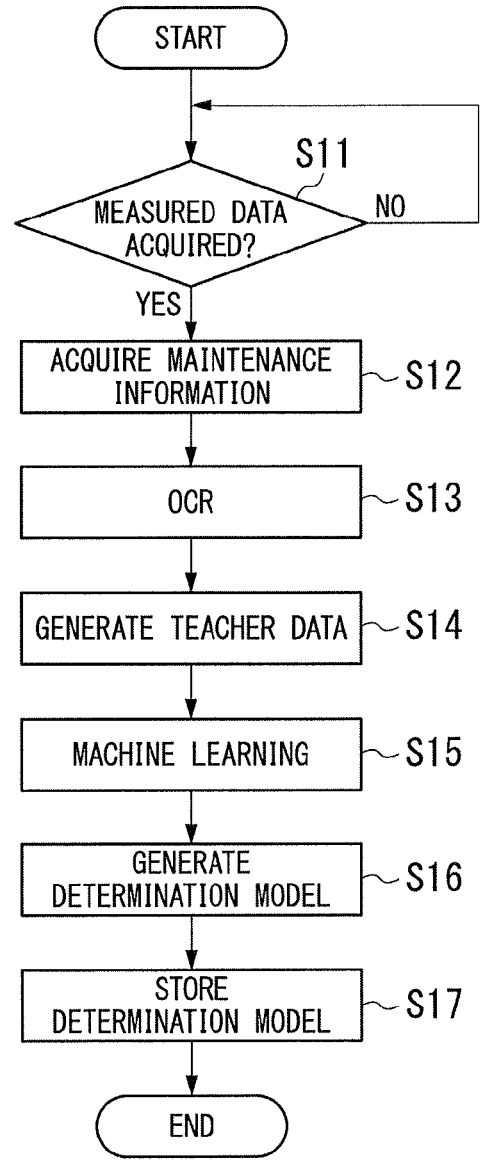
FIG. 5 is a flowchart showing an example of an operation of a learning phase in the information processing device of embodiments.

Next, an operation of the learning phase in the information processing device 1 will be described with reference to FIG. 5. FIG. 5 is a flowchart showing an exemplary operation of the learning phase in the information processing device 1 of embodiments.

The learning phase is a process through which a determination model is generated and registered on the basis of measured data. The operation of the flowchart shown in FIG. 5 has been described with reference to FIG. 4. It is assumed that the operation is executed as each of functions of the information processing device 1. Accordingly, the following description is based on the assumption that the subject of the operation of a process which will be described below is the information processing device 1.

In FIG. 5, the information processing device 1 determines whether measured data has been acquired (step S11). In determination of whether measured data has been acquired, for example, the measured data acquirer 101 may determine whether to acquire measured data from the sensor S1. The measured data may be acquired regularly, for example, every hour, during operation of the plant. The measured data may be acquired along with maintenance information during maintenance work which is irregularly performed. For example, measured data acquired along with a measured data history obtained from the PIMS 3A or a maintenance history from the CMMS 3B includes such regularly acquired measured data and irregularly acquired measured data. When it is determined that measured data has not been acquired (NO in step S11), the information processing device 1 repeats the process of step S11 and waits for acquisition of measured data.

On the other hand, when it is determined that measured data has been acquired (YES in step S11), the information processing device 1 acquires maintenance information (step S12). For example, the maintenance information may be acquired by the maintenance information acquirer 102 reading maintenance information of a maintenance history acquired from the CMMS 3B and stored in the HDD 14 or the like. After execution of the process of step S12, the information processing device 1 executes an OCR process (step S13). For example, the OCR process is executed by the OCR processor 103 converting image information of a maintenance record of an inspection list optically read through the scanner 16A into character information. It is possible to integrate electronic information such as the maintenance history acquired from the CMMS 3B and the like and information of a maintenance record written on paper and the like by acquiring the maintenance record of the inspection list through the OCR process.

After execution of the process of step S13, the information processing device 1 generates teacher data (step S14). In generation of teacher data, label information of the maintenance information is associated with the measured data to generate teacher data on the basis of a maintenance implementation status. Here, the maintenance implementation status is whether maintenance has been performed (presence or absence of maintenance) or a time when maintenance has been performed, and the like, for example.

<Generation of Teacher Data Based on Presence or Absence of Maintenance>

The learner 104 may associate label information of maintenance information with measured data to generate teacher data on the basis of the presence or absence of maintenance. The teacher data includes the measured data and labels associated with the measured data. The labels associated with the measured data include four types indicating to (0) no problem, (1) zero-point adjustment is required, (2) sensor cleaning is required and (3) sensor replacement is required. For example, the learner 104 associates the label indicating (0) no problem with measured data acquired when maintenance has not been performed to generate teacher data. Further, the learner 104 associates a label indicating any one of (1) zero-point adjustment is required, (2) sensor cleaning is required, and (3) sensor replacement is required with measured data to generate teacher data on the basis of the details of performed maintenance when maintenance has been performed. The type and number of associated labels may be arbitrarily set depending on the details of maintenance.

<Generation of Teacher Data Based on Time when Maintenance has Been Performed>

The learner 104 may associate label information of maintenance information with measured data to generate teacher data on the basis of a time when maintenance has been performed. Similarly, labels associated with measured data include four types indicating (0) no problem, (1) zero-point adjustment is required, (2) sensor cleaning is required, and (3) sensor replacement is required. The learner 104 compares a time when maintenance has been performed with a time when measured data has been obtained, and associates the label indicating (0) no problem with the measured data to generate teacher data when the time when maintenance has been performed does not correspond to the time when measured data has been obtained. For example, correspondence between the time when maintenance has been performed and the time when measured data has been obtained includes a case in which the time when the measured data has been obtained is included in the time when maintenance has been performed, a case in which the time when the measured data has been obtained is close to the time when maintenance has been performed, or the like. On the other hand, when the time when maintenance has been performed corresponds to the time when measured data has been obtained, the learner 104 associates any one of the labels indicating (1) zero-point adjustment is required, (2) sensor cleaning is required, and (3) sensor replacement is required with the measured data to generate teacher data depending on the details of the maintenance for which the times correspond to each other.

The learner 104 may select whether to generate teacher data from acquired measured data and learn the selected teacher data. Selection of measured data will be described detail with reference to FIG. 8.

It is possible to automatically perform association of input information acquired from individual devices as shown in FIG. 2 by associating measured data with labels depending on a maintenance implementation status. Association between measured data and labels may be performed through other methods. For example, association between measured data and labels may be manually performed. Association may be performed by conforming a maintenance place of measured data to a maintenance place (a folder in a file system, or the like) of maintenance information.

After execution of the process of step S14, the information processing device 1 performs machine learning on the teacher data generated in step S14 (step S15). For example, machine learning is performed by the learner 104 using the SVM method. The learner 104 generates a determination model by performing machine learning on the measured data associated with a label (step S16). The determination model is used to set a determination line for separating measured data associated with (0) no problem from measured data associated with (1) zero-point adjustment is required, (2) sensor cleaning is required or (3) sensor replacement is required.

After execution of the process of step S16, the information processing device 1 stores the generated determination model (step S17). For example, storage of the determination model may be executed in such a manner that the determination model storage 105 stores the determination model generated by the learner 104 in the HDD 14 or the like, for example.

After execution of the process of step S17, the information processing device 1 ends the operation of the learning phase in the flowchart shown in FIG. 5.

Figure 6:
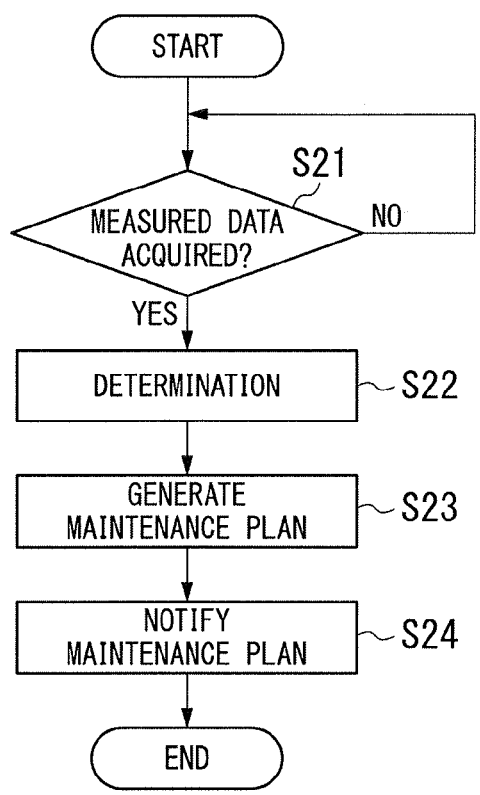
FIG. 6 is a flowchart showing an example of an operation of an execution phase in the information processing device of embodiments.

Next, an operation of an execution phase in the information processing device 1 will be described with reference to FIG. 6. FIG. 6 is a flowchart showing an exemplary operation of the execution phase in the information processing device 1 of embodiments.

The execution phase is a process of deciding for the acquired measured data on the basis of the determination model generated in the learning phase described in FIG. 5. It is assumed that the operation of the flowchart shown in FIG. 6 is executed in each function of the information processing device 1 described with reference to FIG. 5 and the subject of the following process is the information processing device 1.

In FIG. 6, the information processing device 1 determines whether measured data has been acquired (step S21). Determination of whether measured data has been acquired may be performed in the same manner as the process of step S11 of FIG. 5. When it is determined that measured data has not been acquired (NO in step S21), the information processing device 1 repeats the process of step S21 and waits for acquisition of measured data.

On the other hand, when it is determined that measured data has been acquired (YES in step S21), the information processing device 1 executes a determination process (step S22). The determination process is a process of deciding whether the measured data acquired in step S21 is included in any determination region when the determination model generated in the learning phase is applied. When there are multiple determination regions decided as multiple labels, whether the measured data is included in any one region is decided. For example, the determination process is executed by the maintenance plan generator 106. The maintenance plan generator 106 decides whether the measured data is associated with any one of the four labels indicating (0) no problem, (1) zero-point adjustment is required, (2) sensor cleaning is required, and (3) sensor replacement is required.

After execution of the process of step S22, the information processing device 1 generates a maintenance plan for the sensor S1 on the basis of the determination result (step S23). For example, generation of the maintenance plan is performed by the maintenance plan generator 106. The maintenance plan generator 106 generates a maintenance plan depending on each of determination results indicating (1) zero-point adjustment is required, (2) sensor cleaning is required, and (3) sensor replacement is required on the basis of the determination results. The details of a maintenance plan is arbitrary, and in the case of a determination result indicating (0) no problem, may include information of the determination result only, for example.

After execution of the process of step S23, the information processing device 1 notifies the maintenance plan generated in the process of step S23 (step S24). For example, notification of the maintenance plan is executed by the maintenance plan notifier 107. The maintenance plan notifier 107 notifies the details of the maintenance plan to the maintenance operator by providing the maintenance plan generated by the maintenance plan generator 106 to the PIMS 3A, the operation control device 4, the operation panel 5, the maintenance apparatus 6, the field operator terminal 7, the display device 15, etc.

The maintenance plan notifier 107 may change the details of the maintenance plan, a data format and the like depending on a destination to which the maintenance plan is provided, such as the PIMS 3A. For example, the maintenance plan notifier 107 may provide information representing that preventive maintenance is possible, such as a predicted maintenance time, to the PIMS 3A and provide information representing urging maintenance work to be performed immediately to the operating panel 5. The maintenance plan notifier 107 can improve maintenance work efficiency and plant availability by changing the details of the maintenance plan, and the like depending on a destination to which the maintenance plan is provided.

After execution of the process of step S24, the information processing device 1 ends the operation of the execution phase in the flowchart shown in FIG. 6.

Next, an inspection list through which the information processing device 1 acquires maintenance information will be described with reference to FIG. 7. FIG. 7 is a diagram showing an example of an inspection list through which the information processing device 1 of embodiments acquires maintenance information.

In FIG. 7, the inspection list has a format in which an operator writes necessary items. The inspection list includes items such as a sequential numbers, an execution date and time, a person in charge, an execution place, an inspection target, and inspection items, as a work history. A date and time immediately before maintenance work is initiated are written as the execution date and time item in order to generate teacher data from measured data. The inspection items have check boxes to be checked by the maintenance operator. Generation of teacher data from measured data relates to "sensor detector is dirty" in the inspection list in the present embodiment, and thus an inspection list having a check associated with this item becomes maintenance information acquired in the information processing device 1. The maintenance operator writes arbitrary details in a remarks column by hand.

An inspection list is created whenever the maintenance operator performs maintenance work using the maintenance apparatus 6 or the like. The inspection list may be an electronic inspection list which is automatically created by the maintenance apparatus 6 or a paper inspection list created by the maintenance operator by writing by hand. The created inspection list is optically read by the scanner 16A and converted into character information in the OCR processor. Here, whether the inspection item "sensor detector is dirty" is checked is determined and a work history of inspection lists having this check is acquired as maintenance information by the information processing device 1. At this time, the details hand-written in the remarks column is also converted into character information and acquired.

Although a case in which the maintenance operator creates one inspection list for each item of maintenance work is shown in FIG. 7, the inspection list may be a list for a plurality of maintenance items, for example. The inspection list may be configured in such a manner that characters and the like are directly input through a touch panel and the like. The inspection list may include subsidiary information such as a captured image of a field apparatus or the like, recorded data when maintenance work is performed, printed paper output from a measuring instrument, and the like. For example, the subsidiary information may be managed using consecutive numbers and acquired by the information processing device 1.

Next, teacher data generated on the basis of maintenance information acquired by the information processing device 1 will be described with reference to FIG. 8. FIG. 8 is a diagram showing an example of teacher data generated by the information processing device 1 of embodiments. For example, the teacher data is generated in step S15 of FIG. 5 on the basis of a maintenance history acquired from the CMMS 3B.

In FIG. 8, the teacher data includes items of a measurement date and time, measured values of parameters 1 to 3, details of maintenance, teacher data selection, a label (determined value) and remarks. For example, the measurement date and time, measured values of parameter 1 to 3 and the details of maintenance may be measured data based on a maintenance history acquired from the CMMS 3B. Teacher data selection is an item for selecting whether teacher data is generated from data in the acquired measured data. Measured data in which teacher data selection is checked is selected as teacher data. Teacher data selection can be automatically performed in the learner 104 or can be manually corrected. The label is a label associated with measured data. The remarks are information arbitrarily added to each piece of measured data.

For example, it is assumed that measured data on the first line which has a measurement date and time of "Oct. 10, 2016 08:00:00" is measured data acquired every hour and the measured values are in a normal state in which maintenance work is not required. This measured data is associated with a label indicating (0) no problem by the learner 104 and selected as teacher data. In this manner, measured data having normal measured values and regularly acquired may be automatically selected as teacher data. Similarly, measured data on the second and third lines is associated with the label indicating (0) no problem and selected as teacher data.

Measured data on the fourth line of "Oct. 10, 2016 11:03:00" represents that zero-point adjustment has been performed according to regular adjustment. With respect to maintenance work, there are cases in which maintenance work is performed irrespective of the presence or absence of abnormality from the viewpoint of preventive maintenance. In this case, measured values of measured data may be normal and thus, when a label indicating zero-point adjustment is associated with the measured data as teacher data, determination accuracy of zero-point adjustment decreases. When a maintenance work is performed according to regular adjustment in this manner, the learner 104 does not select the measured data as teacher data.

On the other hand, measured data of "Oct. 11, 2016 13:25:00" represents that zero-point adjustment has been performed because abnormality has been discovered in a measured value (parameter). Abnormality in a parameter can be determined according to whether a measured value exceeds a predetermined threshold value. Zero-point adjustment in the details of maintenance represents that parameter abnormality has been eliminated according to zero-point adjustment. That is, zero-point adjustment indicates that the cause of parameter abnormality is zero-point deviation. In this case, first measured data and second measured data acquired during a predetermined period before the measurement date and time of the first measured data are associated with the label indicating (1) zero-point adjustment is required and learnt as teacher data manually or automatically using the learner 104. This is because there is a high likelihood that the second measured data acquired during a predetermined period before the measurement date and time of the first measured data has the feature that zero-point adjustment has been required. A range (a predetermined period before the measurement date and time) of measured data selected as teacher data may be increased or decreased by verifying the accuracy of the generated determination model.

Measured data of "Oct. 13, 2016 15:45:20" represents that contamination of the sensor detector has been confirmed through maintenance work and maintenance work for sensor cleaning has been performed. In this case, first measured data and second measured data acquired during a predetermined period before the measurement date and time of the first measured data are associated with the label indicating (2) sensor cleaning is required and learnt as teacher data manually or automatically using the learner 104.

This is because there is a high likelihood that the second measured data acquired during a predetermined period before the measurement date and time of the first measured data has the feature that sensor cleaning has been required.

Measured data of "Oct. 25, 2016 11:03:45" represents that maintenance work for sensor replacement has been performed due to parameter abnormality. In this case, first measured data and second measured data acquired during a predetermined period before the measurement date and time of the first measured data are associated with the label indicating (3) sensor replacement is required and learnt as teacher data manually or automatically using the learner 104. This is because there is a high likelihood that the second measured data acquired during a predetermined period before the measurement date and time of the first measured data has the feature that sensor replacement has been required.

In the present embodiment, the sensor S1 learns each of measured values of parameters 1 to 3 of three types as teacher data. As described above, since the influence on each measured value depends on the cause of abnormality of the sensor S1, it is possible to improve the accuracy of determination of the cause of abnormality of the sensor S1 by using each of the measured values of parameters 1 to 3 as teacher data.

The teacher data selection method described FIG. 8 is arbitrary. For example, determination of whether association of labels is performed automatically or manually may be changed. Whether measured data is selected as teacher data may be determined using a predetermined algorithm.

Figure 9:
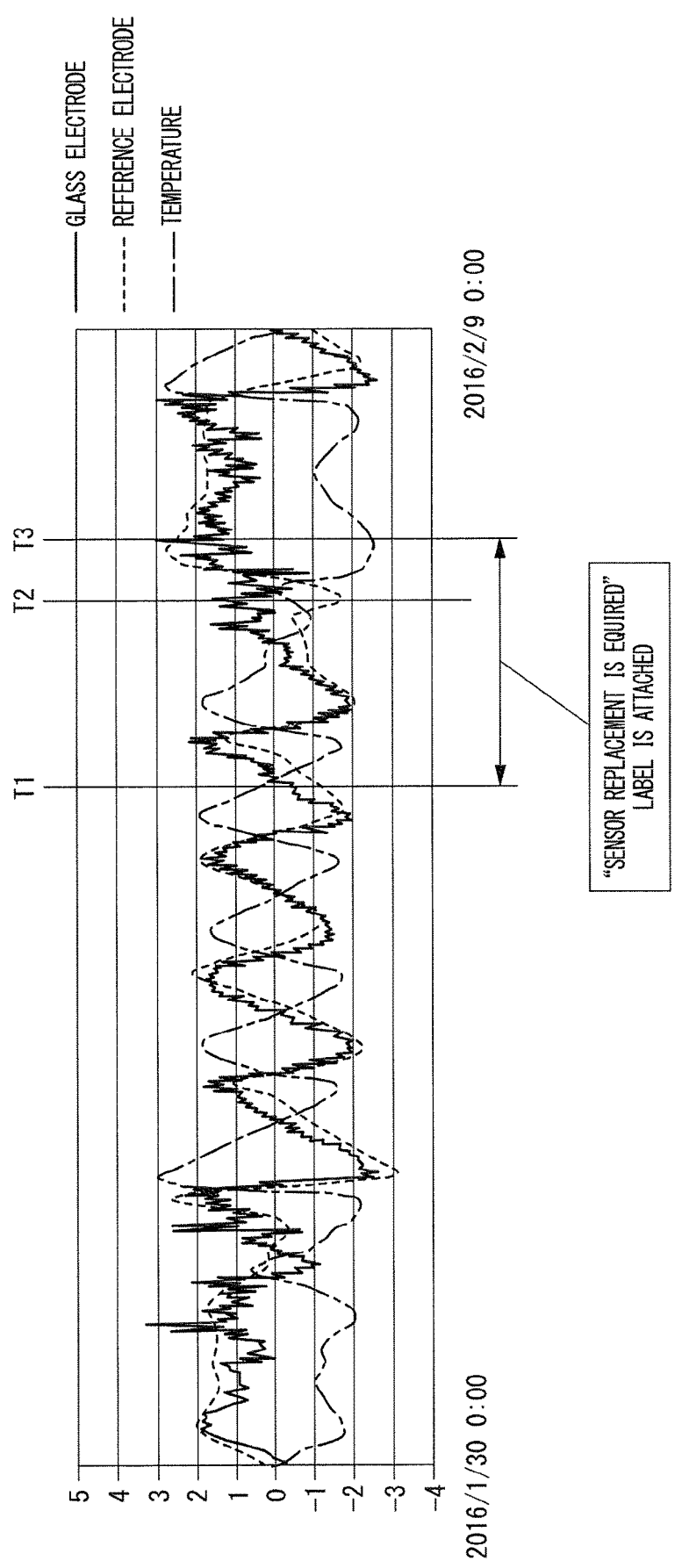
FIG. 9 is a diagram showing an example of association of labels with measured data in the information processing device of embodiments.

Next, association of labels with measured data in the information processing device 1 will be described with reference to FIG. 9. FIG. 9 is a diagram showing an example of association of labels with measured data in the information processing device of embodiments.

FIG. 9 shows temporal change in measured values of a pH sensor having three parameters of a glass electrode, a reference electrode and temperature. The measurement date and time represented on the horizontal axis are Jan. 30, 2016 to Feb. 9, 2016. When parameter abnormality is detected at date and time T2 and maintenance work for sensor replacement is performed at date and time T3, the label indicating (3) sensor replacement is required is associated with measured data between date and time T1 a predetermined time before the date and time T2 and date and time T3 to generate teacher data. For example, it is possible to shift the date and time T1 forward and backward while checking the change in measured values shown in FIG. 9. The accuracy of the determination model can be improved by selecting a range of teacher data while checking measured values.

As described above, the information processing device of the present embodiment can correctly determine a maintenance time of a sensor to reduce maintenance costs by including a measured data acquirer which acquires measured data of the sensor, a maintenance information acquirer which acquires maintenance information related to maintenance of the sensor which is performed by an operator, a learner which learns teacher data generated by associating the acquired maintenance information as label information with the acquired measured data to generate a determination model, and a determination model storage which stores the generated determination model.

The aforementioned information processing device 1 may be a device having the above-described functions or may be realized by, for example, a system in which a plurality of devices are combined and the respective devices are connected such that they can communicate. The information processing device 1 may be realized as a part of functions of the manufacturing execution system 3, the operation control device 4, the maintenance apparatus 6 and the like described in FIG. 1.

The information processing method of the present embodiment can correctly determine a maintenance time of a sensor to reduce maintenance costs by including a measured data acquisition step of acquiring measured data of the sensor, a maintenance information acquisition step of acquiring maintenance information related to maintenance of the sensor which is performed by an operator, a learning step of learning teacher data generated by associating the acquired maintenance information as label information with the acquired measured data to generate a determination model, and a determination model storage step of storing the generated determination model.

The execution order of the steps in the information processing method of the present embodiment is not limited to the described order of the steps and the steps may be executed in any order.

The above-described various processes of the present invention may be performed by recording a program for realizing the functions constituting the device described in the present embodiment on a computer-readable storage medium and causing a computer system to read and execute the program recorded on the storage medium. The "computer system" described here may include an OS and hardware such as a peripheral apparatus. If a WWW system is used, the "computer system" may include a homepage providing environment (or display environment). The "computer-readable storage medium" refers to storage devices such as writable non-volatile memories such as a flexible disk, a magneto-optical disk, a ROM and a flash memory, portable media such as a CD-ROM, and a hard disk embedded in a computer system.

Further, the "computer-readable storage medium" may include one which saves a program for a specific time, such as a volatile memory (e.g., a dynamic random access memory (DRAM)) inside a computer system which is a server or a client when the program is transmitted via a network such as the Internet or a communication channel such as a telephone line. In addition, the aforementioned program may be transmitted to other computer systems from a computer system in which the program has been stored in a storage device or the like via a transmission medium or according to transmission waves in the transmission medium. The "transmission medium" through which the program is transmitted refers to a medium having a function of transmitting information, such as a network (communication network) such as the Internet or a communication channel (communication line) such as a telephone line. The aforementioned program may realize part of the above-described functions. Further, the program may be a program realized by combining the aforementioned functions with a program which has been recorded in the computer system, a so-called difference file (difference program).

Although embodiments of the present invention have been described with reference to the drawings, a specific configuration is not limited to the embodiments and various modifications can be made in the present invention without departing from the spirit of the invention.

What is claimed is:

1. An information processing device for automatically managing maintenance of sensors in an industrial plant comprising:
a processor configured to execute instructions to:
acquire measured data of the sensor;
acquire maintenance information related to maintenance performed on the sensor;
learn teacher data in which the acquired maintenance information as label information is associated with the acquired measured data to generate a determination model; and
store the generated determination model,
wherein the processor is further configured to execute the instructions to:
acquire a plurality of types of measured data of the sensor;
associate the maintenance information as label information with the acquired plurality of types of measured data; and
learn the plurality of types of measured data associated with the label information, and
wherein, when abnormality is detected at a first date and time and the maintenance is performed at a second date and time, the processor is further configured to execute the instructions to:
associate the maintenance information of the maintenance performed at the second date and time as label information with the plurality of types of measured data between a third date and time a predetermined time before the first date and time and the second date and time to generate the teacher data; and
learn the generated teacher data.

2. The information processing device according to claim 1, wherein the processor is further configured to execute the instructions to generate a maintenance plan for the sensor on the basis of the acquired measured data and the stored determination model.

3. The information processing device according to claim 2, wherein the processor is further configured to execute the instructions to perform notification of the generated maintenance plan.

4. The information processing device according to claim 1, wherein the processor is further configured to execute the instructions to associate the label information with the measured data and learn the measured data associated with the label information on the basis of an implementation status of the maintenance.

5. The information processing device according to claim 1, wherein the processor is further configured to
execute the instructions to convert image information of a maintenance record recorded by an operator into character information, and
acquire the maintenance information by acquiring the character information.

6. The information processing device according to claim 1, wherein the processor is further configured to execute the instructions to select whether to set the acquired measured data as teacher data and learn the selected teacher data.

7. The information processing device according to claim 6, wherein the processor is further configured to execute the instructions to set as teacher data measured data including normal measured values and acquired regularly.

8. The information processing device according to claim 6, wherein the processor is further configured to execute the instructions not to set as teacher data measured data acquired in regular adjustment for the sensor.

9. The information processing device according to claim 1,
wherein the processor is further configured to execute the instructions to display a diagram showing temporal change in the acquire measured data, a range of the teacher data being manually selectable in the diagram, and
wherein, when abnormality is detected at the first date and time and the maintenance is performed at the second date and time, the processor is further configured to execute the instructions to:
associate the maintenance information of the maintenance performed at the second date and time as label information with the plurality of types of measured data between a fourth date and time selected manually before the first date and time and the second date and time to generate the teacher data; and
learn the generated teacher data.

10. The information processing device according to claim 9, wherein the label information comprises four types of labels indicating no problem, zero-point adjustment being required, sensor cleaning being required, and sensor replacement being required.

11. An information processing method for automatically managing maintenance of sensors in an industrial plant comprising:
acquiring measured data of the sensor;
acquiring maintenance information related to maintenance performed on the sensor;
learning teacher data in which the acquired maintenance information as label information is associated with the acquired measured data to generate a determination model; and
storing the generated determination model,
wherein the acquiring of the measured data comprises acquiring a plurality of types of measured data of the sensor,
wherein the learning of the teacher data comprises associating the maintenance information as label information with the acquired plurality of types of measured data and learning the plurality of types of measured data associated with the label information, and
wherein, when abnormality is detected at a first date and time and the maintenance is performed at a second date and time, the maintenance information of the maintenance performed at the second date and time as label information is associated with the plurality of types of measured data between a third date and time a predetermined time before the first date and time and the second date and time to generate the teacher data, and the generated teacher data is learned.

12. The information processing method according to claim 11, further comprising:
generating a maintenance plan for the sensor on the basis of the acquired measured data and the stored determination model.

13. The information processing method according to claim 12, further comprising:
performing notification of the generated maintenance plan.

14. The information processing method according to claim 11, wherein learning the teacher data comprises associating the label information with the measured data and learning the measured data associated with the label information on the basis of an implementation status of the maintenance.

15. The information processing method according to claim 11, further comprising:
   converting image information of a maintenance record recorded by an operator into character information,
   wherein acquiring maintenance information comprises acquiring the maintenance information by acquiring the character information.

16. The information processing method according to claim 11, wherein learning the teacher data comprises selecting whether to set the acquired measured data as teacher data and learning the selected teacher data.

17. The information processing method according to claim 16, wherein learning the teacher data comprises setting as teacher data measured data including normal measured values and acquired regularly.

18. A non-transitory computer-readable storage medium storing a program, which when executed by a computer, causes the computer to automatically manage maintenance of sensors in an industrial plant as follows:
   acquire measured data of the sensor;
   acquire maintenance information related to maintenance performed on the sensor;
   learn teacher data in which the acquired maintenance information as label information is associated with the acquired measured data to generate a determination model; and
   store the generated determination model,
   wherein the acquiring of the measured data comprises acquiring a plurality of types of measured data of the sensor,
   wherein the learning of the teacher data comprises associating the maintenance information as label information with the acquired plurality of types of measured data and learning the plurality of types of measured data associated with the label information, and wherein, when abnormality is detected at a first date and time and the maintenance is performed at a second date and time, the maintenance information of the maintenance performed at the second date and time as label information is associated with the plurality of types of measured data between a third date and time a predetermined time before the first date and time and the second date and time to generate the teacher data, and the generated teacher data is learned.

* * * * *